US012694376B2

(12) United States Patent
Sugawara et al.

(10) Patent No.: US 12,694,376 B2
(45) Date of Patent: Jul. 28, 2026

(54) REPAIR ASSISTANCE SYSTEM, REPAIR ASSISTANCE METHOD, AND RECORDING MEDIUM

(71) Applicant: NEC Corporation, Tokyo (JP)

(72) Inventors: Chisato Sugawara, Tokyo (JP); Toshimichi Yokote, Tokyo (JP); Yosuke Kimura, Tokyo (JP); Yusuke Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 18/692,870

(22) PCT Filed: Oct. 22, 2021

(86) PCT No.: PCT/JP2021/039116
§ 371 (c)(1),
(2) Date: Mar. 18, 2024

(87) PCT Pub. No.: WO2023/067799
PCT Pub. Date: Apr. 27, 2023

(65) Prior Publication Data
US 2024/0428203 A1     Dec. 26, 2024

(51) Int. Cl.
*G06Q 30/00* (2023.01)
*G06Q 10/20* (2023.01)
(Continued)

(52) U.S. Cl.
CPC ......... *G06Q 10/20* (2013.01); *G06Q 30/0283* (2013.01); *G06T 7/0004* (2013.01); *G06T 2207/30184* (2013.01)

(58) Field of Classification Search
CPC .... G06Q 50/08; G06Q 10/20; G06Q 30/0283; G06T 7/0004; G06T 2207/30184; E01C 23/00
See application file for complete search history.

(56) References Cited

U.S. PATENT DOCUMENTS

| 4,958,306 | A | * | 9/1990 | Powell | G01C 7/04 |
| | | | | | 73/146 |
| 11,006,082 | B2 | * | 5/2021 | Carlson | H04N 7/183 |

(Continued)

FOREIGN PATENT DOCUMENTS

| CN | 109610281 A | 4/2019 |
| JP | 2018-028822 A | 2/2018 |

(Continued)

OTHER PUBLICATIONS

Gavilan, et al. "Adaptive Road Crack Detection System by Pavement Classification." Sensors, vol. 11, pp. 9628-9657, 2011. (Year: 2011).*

(Continued)

*Primary Examiner* — Luis A Brown
(74) *Attorney, Agent, or Firm* — Sughrue Mion, PLLC

(57) ABSTRACT

A repair assistance system according to an aspect of the present disclosure includes: at least one memory configured to store instructions; and at least one processor configured to execute the instructions to: detect unrepaired road surface deterioration from a road surface image obtained by imaging a road surface; determine an area of road surface deterioration to be subjected to temporary repair based on the detected unrepaired road surface deterioration; and calculate an amount of a material to be used for the temporary repair of the road surface based on the determined area.

13 Claims, 14 Drawing Sheets

(51) Int. Cl.
    *G06Q 30/0283*      (2023.01)
    *G06T 7/00*        (2017.01)

(56)           References Cited

U.S. PATENT DOCUMENTS

| | | | |
|---|---|---|---|
| 12,240,465 B2* | 3/2025 | Sugawara | B60W 40/06 |
| 2009/0129862 A1* | 5/2009 | Thiel | E01C 3/003 |
| | | | 404/75 |
| 2012/0123969 A1* | 5/2012 | Messmer | G06Q 30/0283 |
| | | | 705/400 |
| 2013/0170701 A1* | 7/2013 | Suzuki | G06T 7/00 |
| | | | 382/103 |
| 2013/0173208 A1* | 7/2013 | Kuzunishi | G01B 5/28 |
| | | | 73/104 |
| 2014/0334689 A1* | 11/2014 | Butler | G06T 7/254 |
| | | | 382/108 |
| 2016/0032536 A1* | 2/2016 | Reda | E01C 23/06 |
| | | | 404/75 |
| 2016/0275404 A1* | 9/2016 | Abraham | G08G 1/202 |
| 2017/0274855 A1* | 9/2017 | Laskey | G08G 1/0141 |
| 2017/0351263 A1* | 12/2017 | Lambermont | H04N 7/183 |
| 2018/0027215 A1* | 1/2018 | Carlson | G06V 10/95 |
| | | | 348/148 |
| 2018/0148898 A1* | 5/2018 | Shimada | E01C 23/01 |
| 2020/0074413 A1* | 3/2020 | Yonekawa | G06Q 10/20 |
| 2020/0317201 A1* | 10/2020 | Takemura | G06V 20/588 |
| 2020/0378945 A1* | 12/2020 | Yamamoto | G01N 19/08 |
| 2021/0409651 A1* | 12/2021 | Carlson | H04N 7/183 |
| 2022/0235522 A1* | 7/2022 | Kusaki | G06T 19/20 |
| 2022/0284557 A1* | 9/2022 | Onishi | G06T 7/0004 |
| 2022/0373473 A1* | 11/2022 | Steffan | G01N 21/8851 |
| 2023/0066871 A1* | 3/2023 | Murray | G06F 3/04847 |
| 2023/0088335 A1* | 3/2023 | Garg | G06V 20/58 |
| | | | 382/103 |
| 2023/0091376 A1* | 3/2023 | Jumonji | G06N 5/022 |
| | | | 706/46 |
| 2023/0108779 A1* | 4/2023 | Jumonji | G06T 7/20 |
| | | | 382/103 |
| 2023/0383485 A1* | 11/2023 | Nakashima | E01C 23/01 |
| 2024/0152876 A1* | 5/2024 | Kimura | G06T 7/0002 |
| 2024/0152877 A1* | 5/2024 | Yano | G06Q 10/20 |
| 2024/0218613 A1* | 7/2024 | Hanko | G06T 7/11 |
| 2024/0428203 A1* | 12/2024 | Sugawara | G06Q 50/08 |
| 2025/0104020 A1* | 3/2025 | Shahin | G06Q 10/20 |

FOREIGN PATENT DOCUMENTS

| | | |
|---|---|---|
| JP | 2019-108755 A | 7/2019 |
| JP | 2019-191095 A | 10/2019 |
| JP | 2020-041403 A | 3/2020 |
| JP | 2021-021288 A | 2/2021 |
| JP | 2021-111089 A | 8/2021 |

OTHER PUBLICATIONS

Maeda, et al. "Road Damage Detection and Classification Using Deep Neural Networks with Smartphone Images." Computer-Aided Civil and Infrastructure Engineering, pp. 1-15, 2018. (Year: 2018).*

Koch, et al. "A Review on Computer Vision Based Defect Detection and Condition Assessment of Concrete and Asphalt Civil Infrastructure." Advanced Engineering Informatics, vol. 29, pp. 196-210, 2015. (Year: 2015).*

Nilsson, et al. "Estimating the Marginal Costs of Road Wear." Transportation Research Part A, vol. 139, pp. 455-471, 2020. (Year: 2020).*

Radopoulou, et al. "Improving Road Asset Condition Monitoring." Transportation Research Procedia No. 14, 2016. (Year: 2016).*

International Search Report for PCT Application No. PCT/JP2021/039116, mailed on Dec. 28, 2021.

English translation of Written opinion for PCT Application No. PCT/JP2021/039116, mailed on Dec. 28, 2021.

* cited by examiner

UNREPAIRED
CRACK

TEMPORARILY
REPAIRED CRACK

Fig.10

| TYPE OF ROAD SURFACE DETERIORATION | MATERIAL FOR PAVEMENT | REPAIR MATERIAL | AMOUNT OF USE |
|---|---|---|---|
| LINEAR CRACK | ASPHALT | RESIN SEALING MATERIAL A | 0mL/m² |
| LINEAR CRACK | CONCRETE | REPAIR MATERIAL FOR CONCRETE B | 0mL/m² |
| POTHOLE | ANY MATERIAL | QUICK-DRYING REPAIR MATERIAL C | 0kg/m² |
| ⋮ | ⋮ | ⋮ | ⋮ |

Fig.11

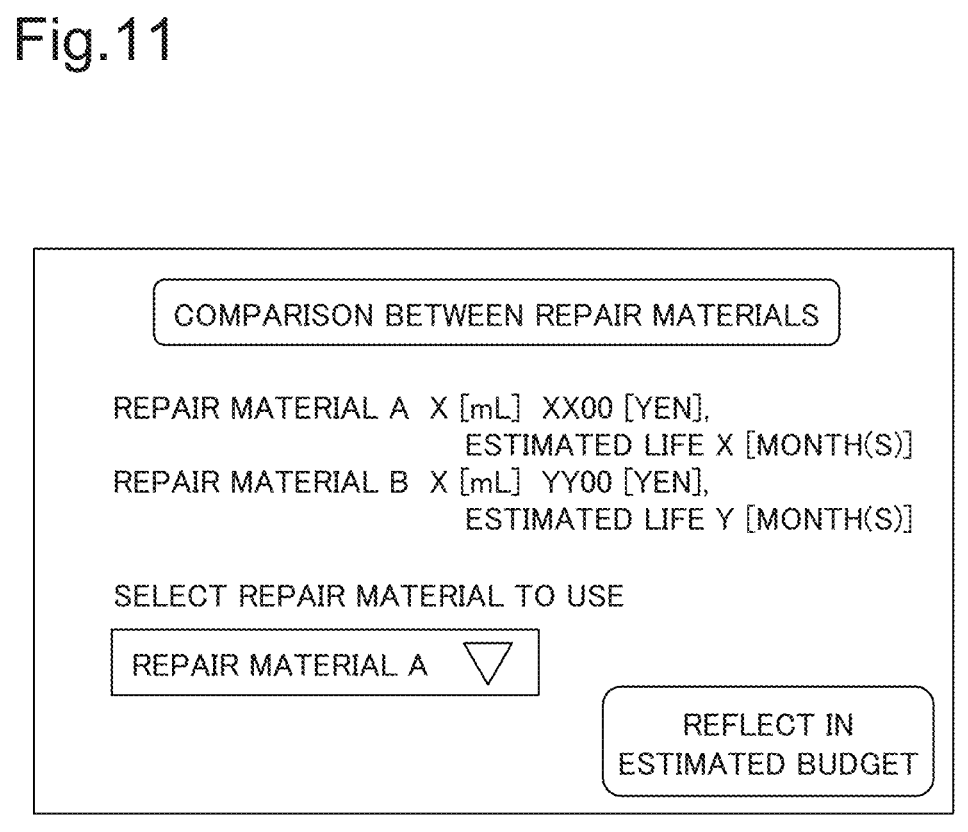

COMPARISON BETWEEN REPAIR MATERIALS

REPAIR MATERIAL A  X [mL]  XX00 [YEN],
                        ESTIMATED LIFE X [MONTH(S)]
REPAIR MATERIAL B  X [mL]  YY00 [YEN],
                        ESTIMATED LIFE Y [MONTH(S)]

SELECT REPAIR MATERIAL TO USE

REPAIR MATERIAL A  ▽

REFLECT IN
ESTIMATED BUDGET

Fig.12

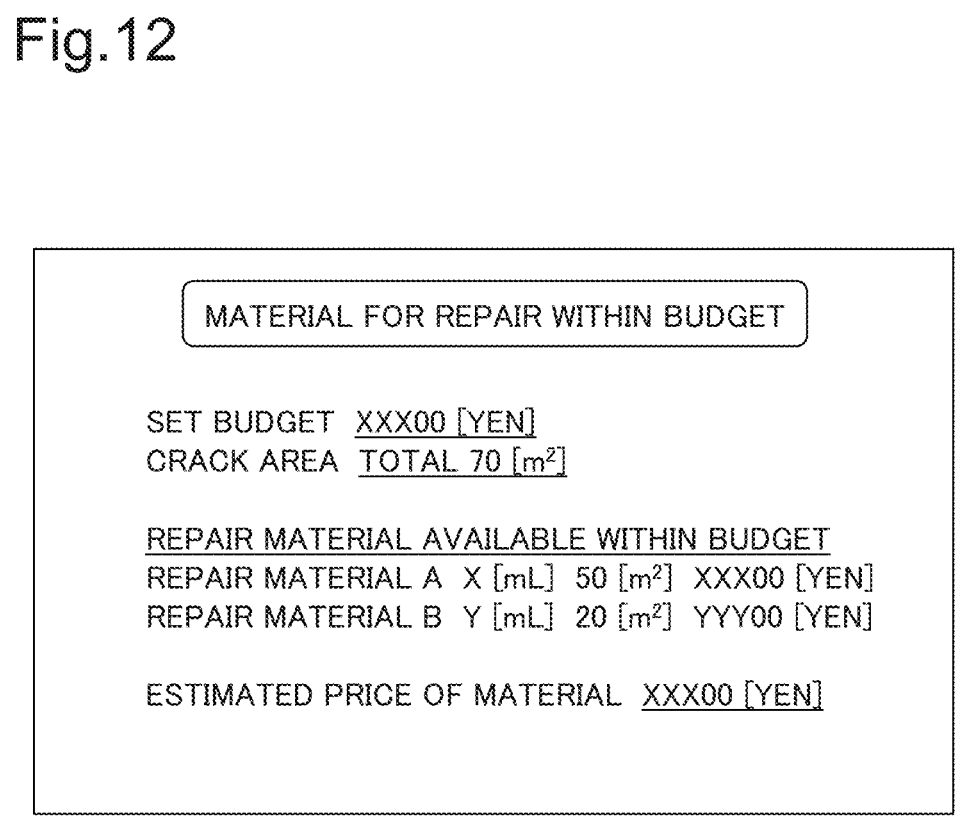

MATERIAL FOR REPAIR WITHIN BUDGET

SET BUDGET  XXX00 [YEN]
CRACK AREA  TOTAL 70 [m²]

REPAIR MATERIAL AVAILABLE WITHIN BUDGET
REPAIR MATERIAL A  X [mL]  50 [m²]  XXX00 [YEN]
REPAIR MATERIAL B  Y [mL]  20 [m²]  YYY00 [YEN]

ESTIMATED PRICE OF MATERIAL  XXX00 [YEN]

Fig.13

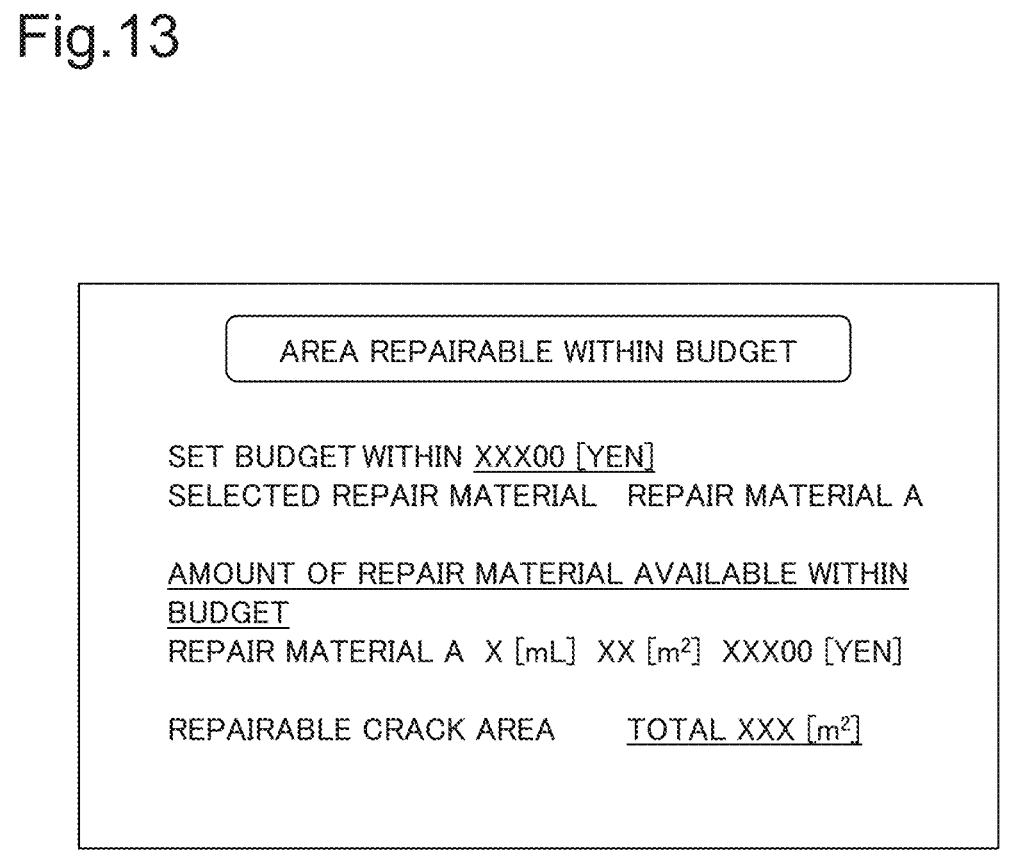

AREA REPAIRABLE WITHIN BUDGET

SET BUDGET WITHIN XXX00 [YEN]
SELECTED REPAIR MATERIAL   REPAIR MATERIAL A

AMOUNT OF REPAIR MATERIAL AVAILABLE WITHIN
BUDGET
REPAIR MATERIAL A   X [mL]   XX [m²]   XXX00 [YEN]

REPAIRABLE CRACK AREA        TOTAL XXX [m²]

REPAIR ASSISTANCE SYSTEM, REPAIR ASSISTANCE METHOD, AND RECORDING MEDIUM

This application is a National Stage Entry of PCT/JP2021/039116 filed on Oct. 22, 2021, the contents of all of which are incorporated herein by reference, in their entirety.

DESCRIPTION

Technical Field

The present disclosure relates to a repair assistance system and the like.

Background Art

In pavement of a road surface, road surface deterioration including a crack and a pothole occurs over time. The road surface is periodically inspected and repaired to ensure safety. The inspection of the road surface is performed by, for example, a person in charge visually observing the road surface or quantitatively measuring the road surface by using a sensor provided in an inspection vehicle.

The repair of the road surface is generally limited by a budget, and thus a plan is made to allocate a repair cost to a road surface in need of repair within the budget. PTL 1 discloses a road surface repair assistance device that allocates a repair cost to each unit section into which an inspection section is subdivided and calculates a total repair cost in the inspection section.

CITATION LIST

Patent Literature

PTL 1: JP 2019-108755 A

SUMMARY OF INVENTION

Technical Problem

Entire pavement construction is costly, and thus temporary repair using a repair material such as a rubber material is performed. In this case, there is a demand for knowing a cost required for temporary repair of pavement. PTL 1 does not refer to calculation of a cost required for temporary repair.

An object of the present disclosure is to provide a repair assistance system or the like that assists in calculating an amount of a material required for temporary repair.

Solution to Problem

A repair assistance system according to the present disclosure includes detection means that detects unrepaired road surface deterioration from a road surface image obtained by imaging a road surface, determination means that determines an area of road surface deterioration to be temporarily repaired based on a detection result, and calculation means that calculates an amount of a material to be used for temporary repair of the road surface based on the determined area.

A repair assistance method according to the present disclosure includes detecting unrepaired road surface deterioration from a road surface image obtained by imaging a road surface, determining an area of road surface deterioration to be temporarily repaired based on a detection result, and calculating an amount of a material to be used for temporary repair of the road surface based on the determined area.

A program according to the present disclosure causes a computer to execute processing of detecting unrepaired road surface deterioration from a road surface image obtained by imaging a road surface, determining an area of the unrepaired road surface deterioration based on a detection result, and calculating an amount of a material to be used for temporary repair of the road surface based on the determined area. The program may be stored in a non-transitory computer-readable recording medium.

Advantageous Effects of Invention

According to the present disclosure, it is possible to assist in calculating an amount of a material required for temporary repair.

BRIEF DESCRIPTION OF DRAWINGS

FIG. 10 shows an example of a material type selection table.

FIG. 11 shows an example of a material comparison screen.

FIG. 12 shows an example of a screen showing a type of a material selected based on a budget.

FIG. 13 shows an example of a screen showing an area of road surface deterioration repairable within a budget.

EXAMPLE EMBODIMENTS

Hereinafter, example embodiments of a repair assistance system, a repair assistance method, a program, and a non-transitory recording medium on which the program is recorded according to the present disclosure will be described in detail with reference to the drawings. The present example embodiments do not limit the disclosed technique.

First Example Embodiment

Figure 1:
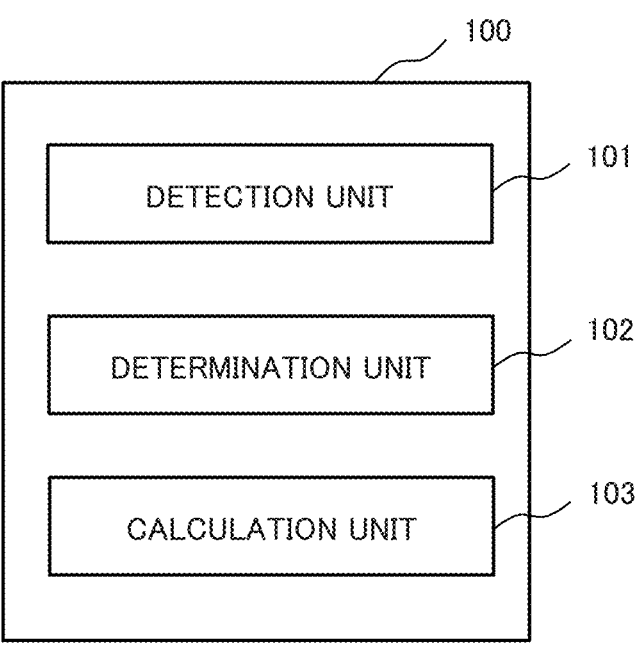
FIG. 1 is a block diagram showing a configuration example according to a first example embodiment.

FIG. 1 is a block diagram showing a configuration example of a repair assistance system 100 according to an example embodiment. The repair assistance system 100 according to a first example embodiment includes a detection unit 101, a determination unit 102, and a calculation unit 103.

In the example embodiment, the repair assistance system 100 is used to calculate an amount of a material required for temporary repair of a road surface.

The temporary repair means that a road surface deterioration portion occurring in pavement is brought into a state in which passage is not hindered. The road surface deterioration occurring in the pavement includes cracks, potholes, rutting, and other flatness abnormalities. The temporary repair of the road surface is also referred to as partial repair, provisional repair, interim repair, or patching repair.

In a case where the road surface deterioration progresses in a wide range and safety cannot be ensured by the temporary repair, entire repair is performed. The entire repair is to pave the road surface again. A construction method of the entire repair includes a replacement method and an overlay method.

As an area of the road surface deterioration increases, more material is used for the temporary repair. Any material including a particle spraying type, an injection type, and a spraying type is used for the temporary repair. An asphalt-based or cement-based material can be used for the repair, and, for example, rubber-based asphalt, resin mortar, gravel, and soil are also used. However, the type of the material to be used for the repair is not limited thereto.

The road surface targeted by the repair assistance system 100 is not limited to a general road on which vehicles and people pass and includes a test course for vehicles and a runway, taxiway, and the like at an airport. That is, the repair assistance system 100 can be widely used for surfaces paved with concrete or asphalt.

The detection unit 101 of the repair assistance system 100 detects unrepaired road surface deterioration from a road surface image obtained by imaging a road surface. The unrepaired road surface deterioration is road surface deterioration not covered with a repair material. The detection unit 101 detects the unrepaired road surface deterioration by recognizing a color and shape of the unrepaired road surface deterioration by a known image recognition technique. The detection unit 101 may determine whether the unrepaired road surface deterioration is present for each pixel. For example, the detection unit 101 can accurately identify a region of a crack by determining road surface deterioration for each pixel. Therefore, the detection unit 101 can detect a difference in length, width, and area of cracks.

The road surface image is captured by an in-vehicle camera such as a driving recorder. However, the type of the camera is not limited thereto, and various types of cameras may be used. For example, the road surface image may be captured by a camera mounted on another moving object such as a bicycle or drone, a camera carried by a person, or a fixed camera installed on a road. The road surface image may be captured by a person or may be automatically captured.

The road surface image captured by the camera may be stored in a database (not shown). At this time, the detection unit 101 may acquire the road surface image from the database. Alternatively, in a case where the repair assistance system 100 is connected to any camera in a wired or wireless manner, the detection unit 101 may acquire the road surface image from the camera.

The detection unit 101 may further acquire a date and time when the road surface image has been captured together with the road surface image. The detection unit 101 may also acquire information regarding a position where the road surface image has been captured together with the road surface image. The information regarding the position includes, for example, a position on a map, latitude and longitude, and position information by a global navigation satellite system (GNSS) or global positioning system (GPS).

Figure 2:
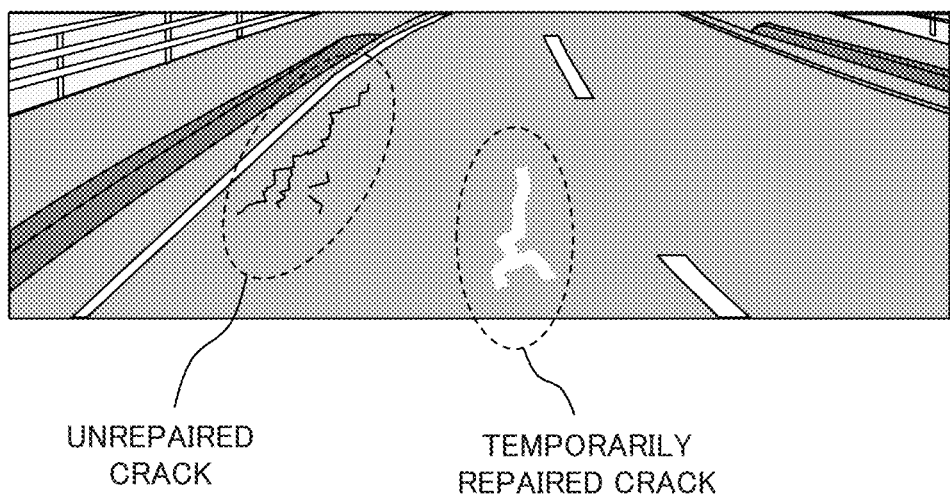
FIG. 2 shows an example of a road surface image.

FIG. 2 shows an example of a road surface image obtained by imaging a road on which a vehicle runs. The road in FIG. 2 has an unrepaired crack at a left end and a temporarily repaired crack on a right side. The detection unit 101 may detect not only unrepaired road surface deterioration, but also temporarily repaired road surface deterioration by image recognition. For example, the detection unit 101 detects the temporarily repaired road surface deterioration by recognizing a repair material on the road.

The determination unit 102 determines an area of road surface deterioration to be temporarily repaired based on a detection result by the detection unit 101. The area of the road surface deterioration indicates an area occupied by a deterioration portion on an actual road surface.

In the first example embodiment, the determination unit 102 determines an area of the unrepaired road surface deterioration included in the road surface image as the area of the road surface deterioration to be temporarily repaired. For example, the determination unit 102 converts the number of pixels indicating the road surface deterioration into the area of the road surface deterioration based on definition of an area of the road surface indicated by one pixel of the road surface image.

The determination unit 102 may not set all road surface deterioration included in the road surface image as a target to be temporarily repaired. Determination of the road surface deterioration to be temporarily repaired will be described later.

The calculation unit 103 calculates an amount of the material to be used for the temporary repair of the road surface based on the area of the road surface deterioration determined by the determination unit 102. The amount of the material to be used is, for example, a volume or weight of a material expected to be used. For example, the calculation unit 103 calculates the amount of the material by multiplying definition of an amount of use per unit area by the determined area. The calculation unit 103 may estimate a volume of the road surface deterioration based on the determined area and an estimated depth of the road surface deterioration. The calculation unit 103 may calculate the amount of the material based on the estimated volume.

The calculation unit 103 may further calculate a price for the amount of the material to be used based on the calculated amount of the material. For example, the calculation unit 103 calculates the price for the amount of the material to be used by multiplying a price per unit amount by the amount of the material to be used. The calculation unit 103 may output a result of comparison between the calculated price and a budget set by a user.

Figure 3:
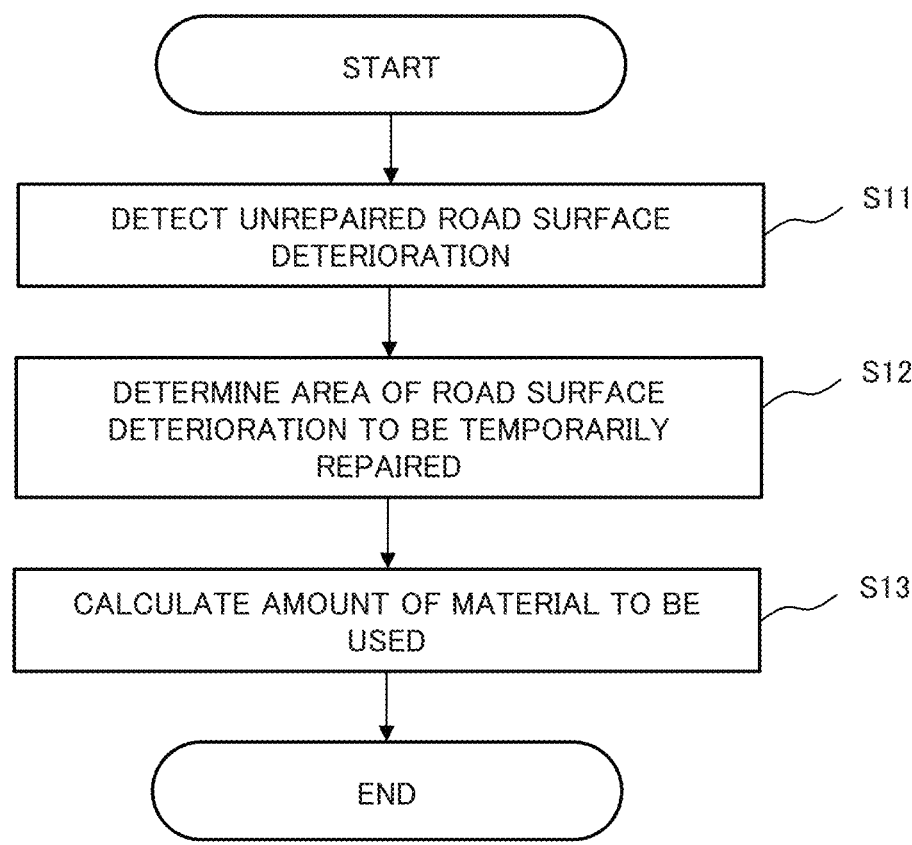
FIG. 3 is a flowchart showing an operation example according to the first example embodiment.

FIG. 3 is a flowchart showing an operation example of the repair assistance system 100 according to the example embodiment.

The detection unit 101 detects unrepaired road surface deterioration from a road surface image obtained by imaging a road surface (step S11). For example, the detection unit 101 calculates the number of pixels of the detected unrepaired road surface deterioration.

The determination unit 102 determines an area of the detected unrepaired road surface deterioration (step S12). For example, the determination unit 102 converts the number of pixels into an area on an actual road surface.

The calculation unit 103 calculates an amount of a material to be used for temporary repair based on the determined area (step S13).

According to the above example embodiment, the detection unit 101 detects unrepaired road surface deterioration from a road surface image obtained by imaging a road surface. The determination unit 102 determines an area of the detected unrepaired road surface deterioration as an area of road surface deterioration to be temporarily repaired. The calculation unit 103 calculates an amount of a material to be used for the temporary repair of the road surface based on the determined area. Therefore, the amount of the material to be used for the temporary repair of the road surface is calculated based on the road surface image. Therefore, according to the example embodiment, it is possible to assist in calculating a cost required for the temporary repair. The cost includes, for example, at least one of the amount of the material required for the temporary repair, a price of the material, time, and labor.

Modification Example

In one example embodiment, the determination unit 102 may determine the area of the road surface deterioration to be temporarily repaired included in one or more regions, among regions into which the road surface is divided within a predetermined range. The calculation unit 103 may calculate the amount of the material to be used for the temporary repair of the road surface deterioration included in the one or more regions.

A method of dividing the road surface is not particularly limited. For example, the road surface may be divided into unit regions.

The unit region is a region defined as a unit for managing the road surface. The unit region may be, for example, a region obtained by dividing a map into a lattice shape or a region obtained by dividing the road surface by any length and width. However, the unit region may be determined by any method. A size of each unit region may be uniform or may be different.

The region set for the above determination of the area or calculation of the amount of the material may be a unit region. For example, the determination unit 102 may determine, for each unit region, the area of the road surface deterioration to be temporarily repaired included in the unit region. The determination unit 102 may also determine a total area of the road surface deterioration to be temporarily repaired included in a plurality of unit regions.

The calculation unit 103 may calculate, for each unit region, the amount of the material to be used for the temporary repair of the road surface deterioration included in the unit region. The calculation unit 103 may also calculate a total amount of the material to be used for the temporary repair of the plurality of unit regions.

The detection unit 101 may detect unrepaired road surface deterioration from one road surface image for each unit region. Alternatively, the detection unit 101 may detect, for each unit region, unrepaired road surface deterioration from a plurality of road surface images obtained by imaging a plurality of points in the unit region.

In a case where there is a plurality of road surface images obtained by imaging the unit region, the detection unit 101 may extract one or a plurality of road surface images as a representative road surface image. For example, in a case where a moving image of a road is captured while a vehicle is running, a representative road surface image to be used for detection of the road surface deterioration can be extracted. The detection unit 101 detects unrepaired road surface deterioration from the representative road surface image. Based on a detection result from the representative road surface image, the determination unit 102 may determine an area of the road surface deterioration in the unit region. The number of images to be subjected to the detection processing and the area determination processing is reduced by using the extracted representative road surface image, which makes it possible to suppress a decrease in processing speed.

A region whose road surface deterioration state is unknown may exist in a part of a target unit region whose road surface deterioration is to be detected by the detection unit 101. For example, in a case where an extraction interval of the representative road surface image exceeds an imaging range of the camera, it is assumed that one or a plurality of road surface images captured for each unit region does not capture an entire road surface in the unit region. It is also assumed that a road surface image of only one lane among a plurality of lanes is captured. In this case, the detection unit 101 cannot detect road surface deterioration that is not imaged.

At this time, the determination unit 102 may estimate an area of unrepaired road surface deterioration existing on a road surface that is not imaged based on one or more road surface images obtained by imaging a part of the unit region.

For the road surface in the same unit region, it can be assumed that the area of the road surface deterioration per unit area is substantially the same. Therefore, the determination unit 102 can estimate the area of the road surface deterioration in the unit region by multiplying an average area of the road surface deterioration per unit area obtained from the one or more road surface images by the area of the unit region. The average area of the road surface deterioration per unit area is obtained by, for example, dividing a total area of the road surface deterioration detected from a plurality of road surface images by a total area of the road surface included in the plurality of road surface images.

The determination unit 102 determines the estimated area of the road surface deterioration in the unit region as the area of the road surface deterioration to be temporarily repaired.

The determination unit 102 may determine whether to temporarily repair the road surface deterioration that is not imaged, which is the estimated unrepaired road surface deterioration. Determination of the road surface deterioration to be temporarily repaired will be described later.

Second Example Embodiment

Figure 4:
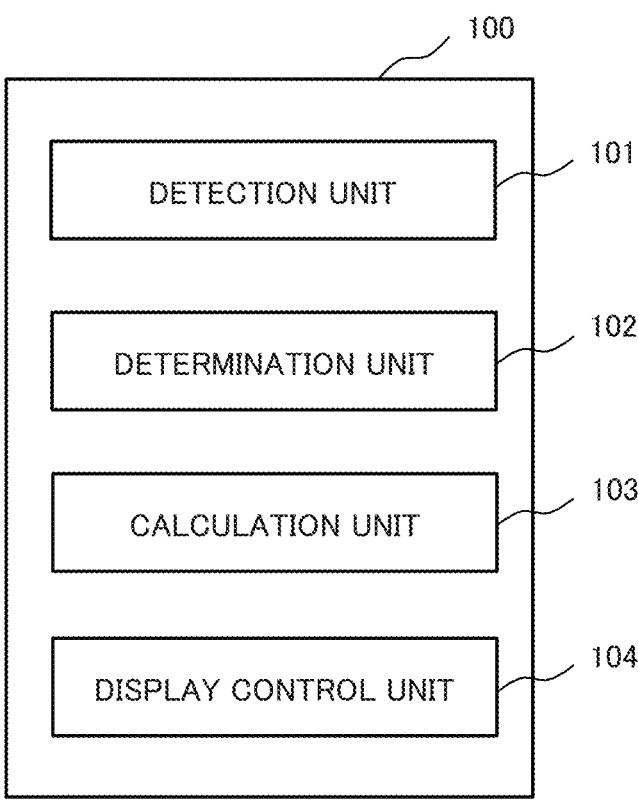
FIG. 4 is a block diagram showing a configuration example according to a second example embodiment.

FIG. 4 is a block diagram showing a configuration example of a repair assistance system 100 according to a second example embodiment. The repair assistance system 100 according to the second example embodiment is different from the repair assistance system 100 according to the first example embodiment in including a display control unit 104. Regarding the configurations of the detection unit 101, the determination unit 102, and the calculation unit 103 according to the second example embodiment, detailed description of configurations similar to those of the first example embodiment will be omitted.

The display control unit 104 displays an amount of a material calculated by the calculation unit 103. For example, the display control unit 104 displays the amount of the material on a display (not shown) such as a display or tablet connected to a computer.

The display control unit 104 may display, for example, an amount of a material to be used for temporary repair of road surface deterioration included in one or more regions among regions into which a road surface is divided within a predetermined range.

The display control unit 104 may accept selection of a region for which the amount of the material is to be displayed among the regions into which the road surface is divided. For example, the display control unit 104 may display a region selection screen. The user selects one or more regions by using, for example, an input device connected to the computer. The input device is, for example, a mouse, keyboard, or a touchscreen display. A method of selecting the region is not particularly limited.

A target to be selected is not limited to a rectangle, and the display control unit 104 may accept selection of a region having any shape. The display control unit 104 displays the calculated amount of the material for the one or more selected regions.

In a case where a plurality of regions is selected, the display control unit 104 displays a total amount of the material calculated for the plurality of selected regions. The display control unit 104 may further display the amount of the material to be used for temporary repair of each of the plurality of selected regions.

The display control unit 104 may accept selection of a region for which the amount of the material is to be displayed for each unit region. The display control unit 104 displays the calculated amount of the material for the selected unit region.

Each unit region may be indicated by a rectangle or arrow on the map. For example, the unit region on a runway or taxiway at an airport may be indicated by a rectangle. The unit region on a general road may be indicated by an arrow. A direction of the arrow indicates a traveling direction of the road. However, the way of indicating the unit region is not limited thereto.

Figure 5:
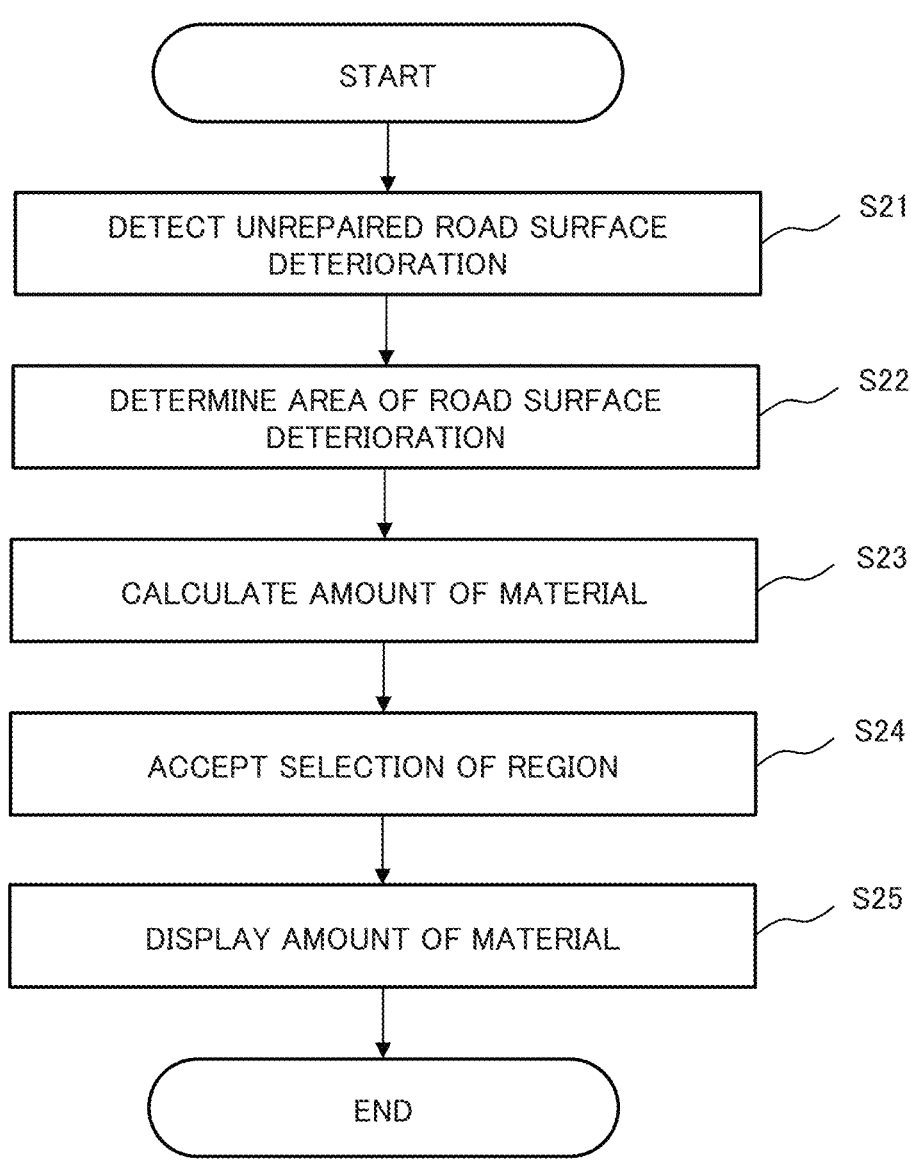
FIG. 5 is a flowchart showing an operation example according to the second example embodiment.

FIG. 5 is a flowchart showing an operation example of the repair assistance system 100 according to the second example embodiment.

The detection unit 101 detects unrepaired road surface deterioration from a road surface image obtained by imaging a road surface (step S21). The detection unit 101 passes a detection result to the determination unit 102.

The determination unit 102 determines an area of road surface deterioration to be temporarily repaired based on the detection result (step S22). The determination unit 102 passes the determined area of the road surface deterioration to the calculation unit 103.

The calculation unit 103 calculates an amount of a material to be used for the temporary repair based on the determined area (step S23). The calculation unit 103 may store a calculation result in a storage unit (not shown).

The display control unit 104 accepts selection as to for which region the amount of the material is to be displayed (step S24). The display control unit 104 acquires the calculated amount of the material for the selected region. Then, the display control unit 104 displays the amount of the material for the selected region (step S25).

The above operation example is an example, and step S24 may be performed before step S21, step S22, or step S23. That is, based on selection of a region to be detected in the display control unit 104, the detection unit 101 may detect road surface deterioration from a road surface image obtained by imaging a road surface of the selected region. Based on the selection of the region to be determined in the display control unit 104, the determination unit 102 may determine an area of road surface deterioration to be temporarily repaired included in the selected region. Based on the selection of the region to be calculated in the display control unit 104, the calculation unit 103 may calculate an amount of a material to be used for the temporary repair of the road surface deterioration included in the selected region.

Figure 6:
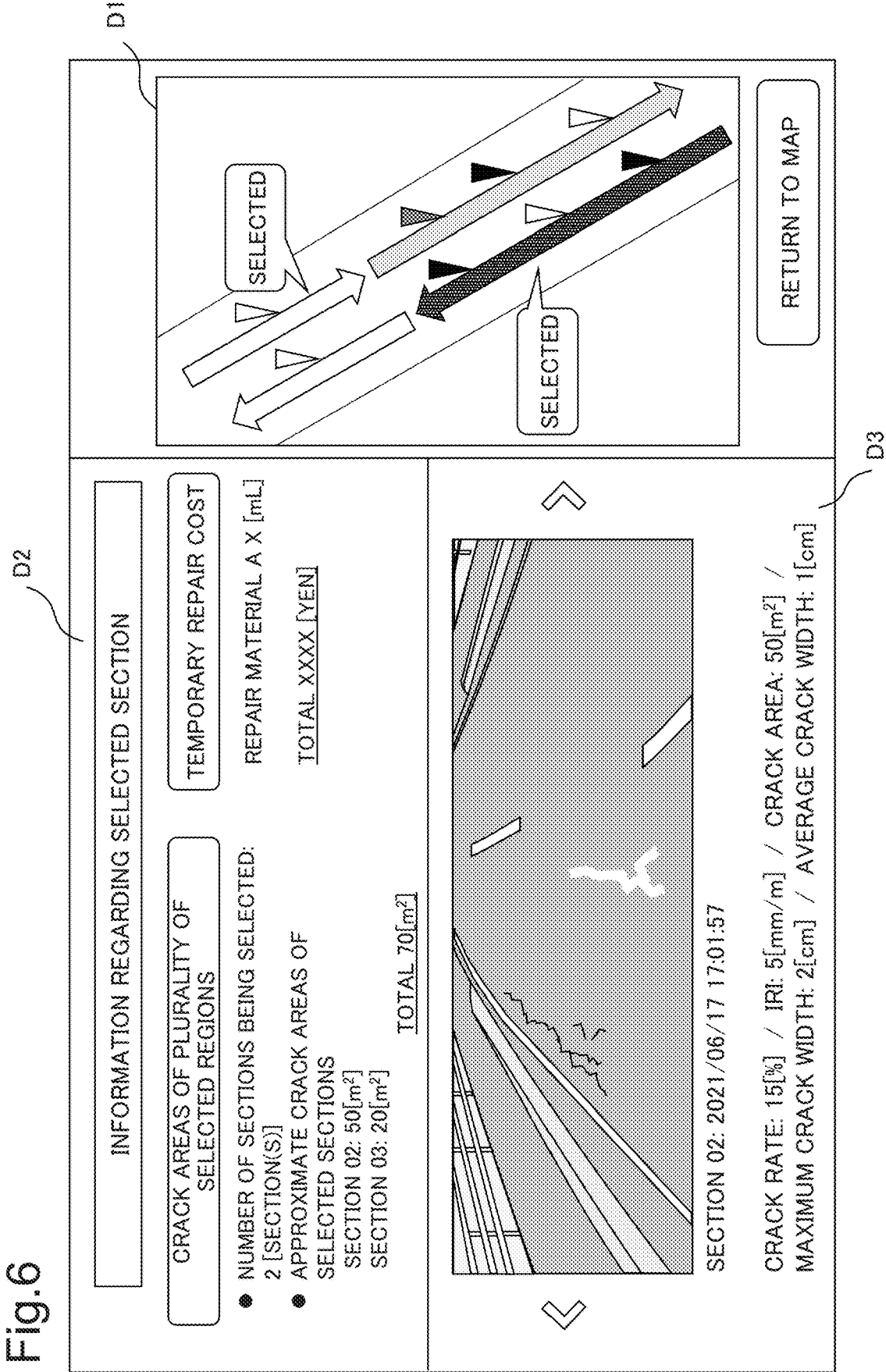
FIG. 6 shows an example of a screen displayed to a user.

FIG. 6 shows an example of a screen displayed to the user. D1 in FIG. 6 displays a region being selected in a map. In D1, four unit regions included in a road section displayed on the map are indicated by Among the four unit regions, two unit regions are selected. arrows. For example, the user selects and cancels unit regions by clicking the arrows indicating the unit regions. In D1, a triangle indicates a point where a road surface image has been captured. The point where the road surface image has been captured may be displayed by an icon other than the triangle. The point in the unit region where the road surface image has been captured may not be displayed.

D2 indicates information regarding the selected unit region. Each unit region is also referred to as a section. In FIG. 6, information regarding cracks is displayed in particular as an example of the road surface deterioration. D2 includes the number of unit regions being selected, an area of the road surface deterioration included in each selected unit region, and a total area thereof. D2 further includes a type, amount, and price of a material to be used for temporary repair of the road surface deterioration of the area.

In D3, for example, information for each unit region is displayed. For example, D3 displays indexes such as a crack rate of the unit region, an international roughness index (IRI), a crack area, a maximum crack width, and an average crack width. The IRI may be calculated based on a value of a running acceleration sensor attached to a vehicle. The detection unit 101 may acquire those indexes together with the road surface image and pass the indexes to the display control unit 104.

The road surface image received from the detection unit 101 may further be displayed in D3. The display control unit 104 may display, in response to a click of the triangle displayed in D1, a road surface image of the corresponding point in D3. The display control unit 104 displays, for example, other road surface images of the same unit region based on clicking arrows displayed on left and right sides of the road surface image. Alternatively, the display control unit 104 may display information of different unit regions in D3 based on the clicking of the arrows.

In D1, a color of the triangle indicates a degree of progress of the road surface deterioration at a point corresponding to a position of the triangle on the map. The degree of progress of the deterioration at the point is detected from a road surface image obtained by imaging the point. FIG. 6 shows that, for example, as the color of the triangle is darker, the road surface deterioration at the point progresses. The degree of progress of the road surface deterioration may be calculated based on at least one of indexes of a shape, size, and area of the road surface deterioration and the crack rate. The shape of the road surface deterioration generally progresses to a linear crack, an alligator crack, or a pothole. The degree of progress of the road surface deterioration may be calculated based on presence or absence of emission of dust occurring from a road surface deterioration portion such as a crack. The occurrence of dust can be detected from the road surface image.

In D1, a color of the arrow indicates the degree of progress of the road surface deterioration in the unit region. FIG. 6 shows that, for example, as the color of the arrow is darker, the road surface deterioration in the unit region progresses. The degree of progress of the road surface deterioration in the unit region may be indicated by an average of the degrees of progress of the road surface deterioration detected from a plurality of road surface images in the unit region. The degree of progress of the road surface deterioration in the unit region may also be calculated from a value of a sensor attached to the vehicle, such as the IRI. The degree of progress of the road surface deterioration may be calculated based on a combination of the degree of progress of the road surface deterioration detected from the road surface image and the value of the sensor.

In D1, the degree of progress of the road surface deterioration is indicated in three stages. For example, a stage of the highest degree of progress of the road surface deterioration may be indicated by red, a stage of the lowest degree thereof may be indicated by green, and a stage of the middle degree thereof may be indicated by yellow. However, the way of indicating the degree of progress by color is not limited thereto. The degree of progress of the road surface deterioration may be indicated by two stages or four or more stages.

Figure 7:
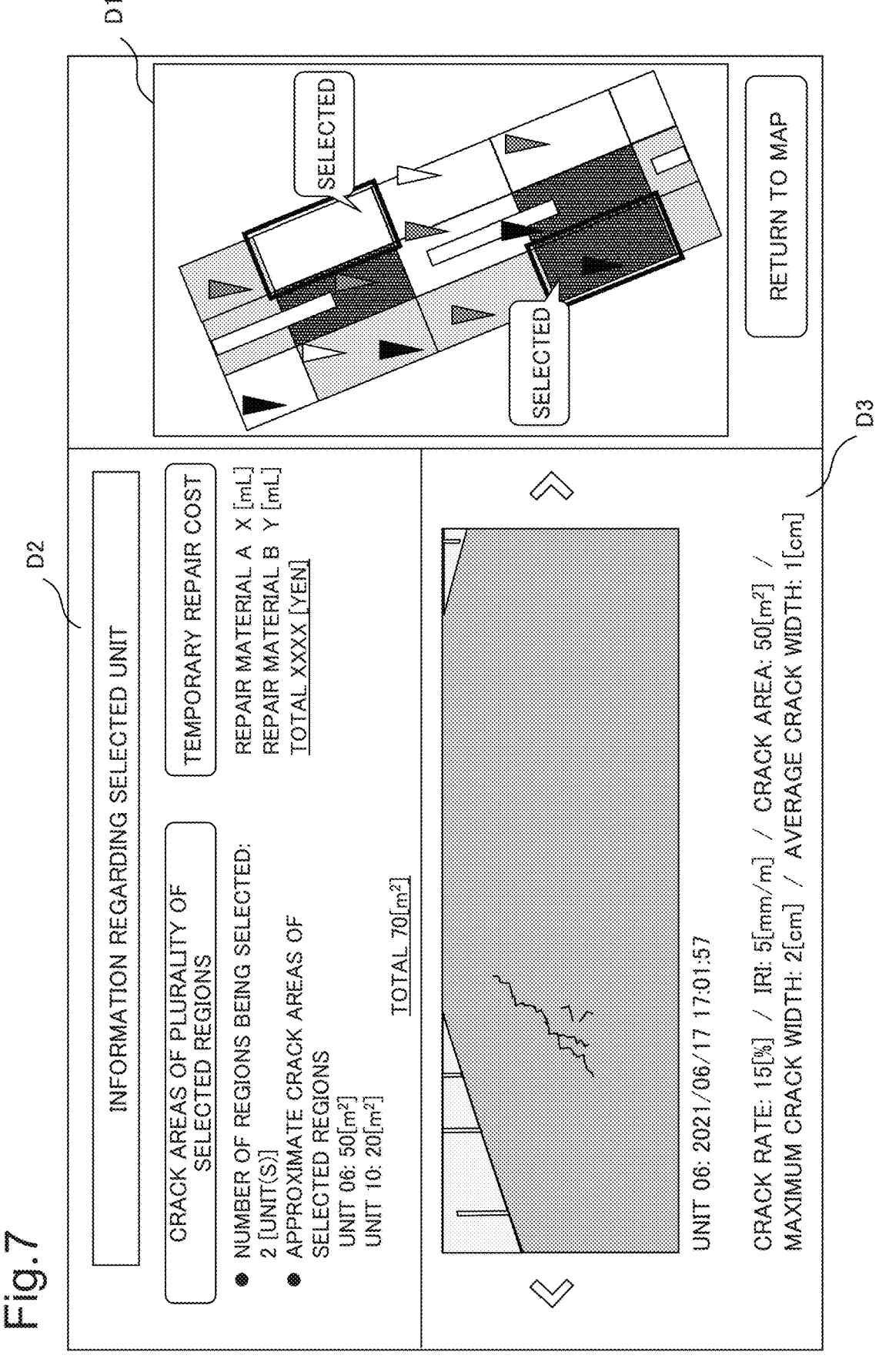
FIG. 7 shows another example of a screen displayed to a user.

FIG. 7 shows another example of the screen displayed to the user. FIG. 7 is different from FIG. 6 in that each unit region is indicated by a rectangle in D1. Each unit region is also referred to as a unit.

The screens shown in FIGS. 6 and 7 are examples, and the display control unit 104 may omit some pieces of the above information. The display control unit 104 may further display information other than the above information. For example, the display control unit 104 may output a result of comparison between a price of the material and a budget set by the user.

According to the above example embodiment, the display control unit 104 displays the calculated amount of the material. Therefore, the amount of the material to be used for the temporary repair is displayed to the user. Therefore, according to the example embodiment, it is possible to assist in calculating a cost required for the temporary repair. The display control unit 104 also displays the amount of the material to be used for the temporary repair of the selected region. Therefore, it is possible to assist in calculating a cost required for temporary repair of a region of interest to the user.

Third Example Embodiment

Figure 8:
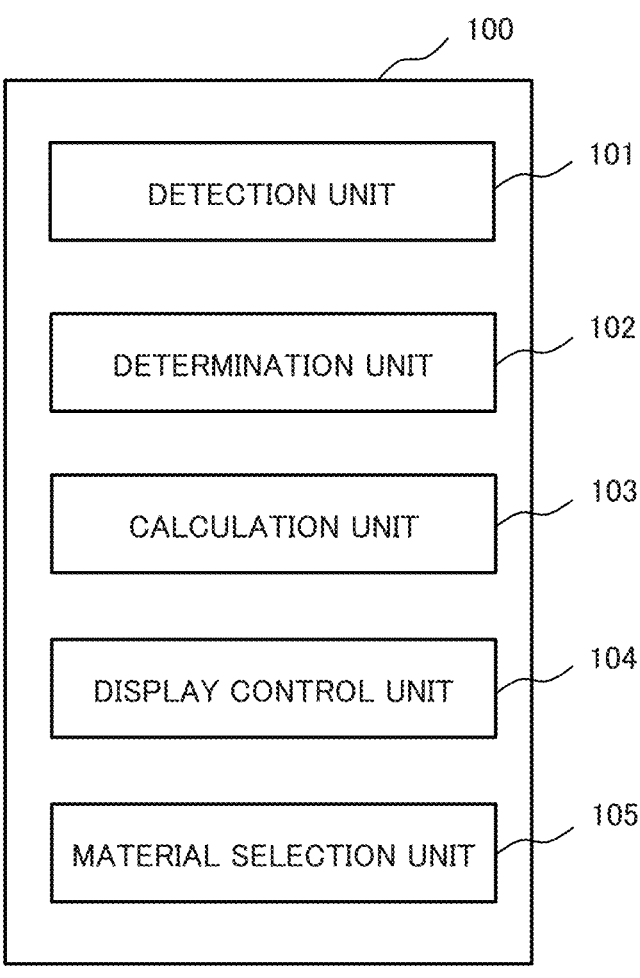
FIG. 8 is a block diagram showing a configuration example according to a third example embodiment.

FIG. 8 is a block diagram showing a configuration example of a repair assistance system 100 according to a third example embodiment. The repair assistance system 100 according to the third example embodiment is different from the repair assistance system 100 according to the second example embodiment in including a material selection unit 105. The material selection unit 105 may be added to the repair assistance system 100 according to the first example embodiment.

Regarding the configurations of the detection unit 101, the determination unit 102, the calculation unit 103, and the display control unit 104 according to the third example embodiment, detailed description of configurations similar to those of the first or second example embodiment will be omitted.

A type of a material to be used may be different depending on a road surface. Therefore, the material selection unit 105 selects the type of the material to be used for temporary repair. The material selection unit 105 may select a combination of a plurality of types of materials. A selection method will be described later.

Depending on the type of the material, an amount of material to be used for temporary repair of road surface deterioration having the same area may be different. For example, it is assumed that a volume of the material changes before and after use depending on the material. A price of the material may differ depending on the type of the material.

Therefore, the calculation unit 103 may calculate the amount of the material of the selected type to be used for the temporary repair. For example, the calculation unit 103 calculates a price for the amount of the material to be used by referring to a price per unit amount for each type of material.

Figure 9:
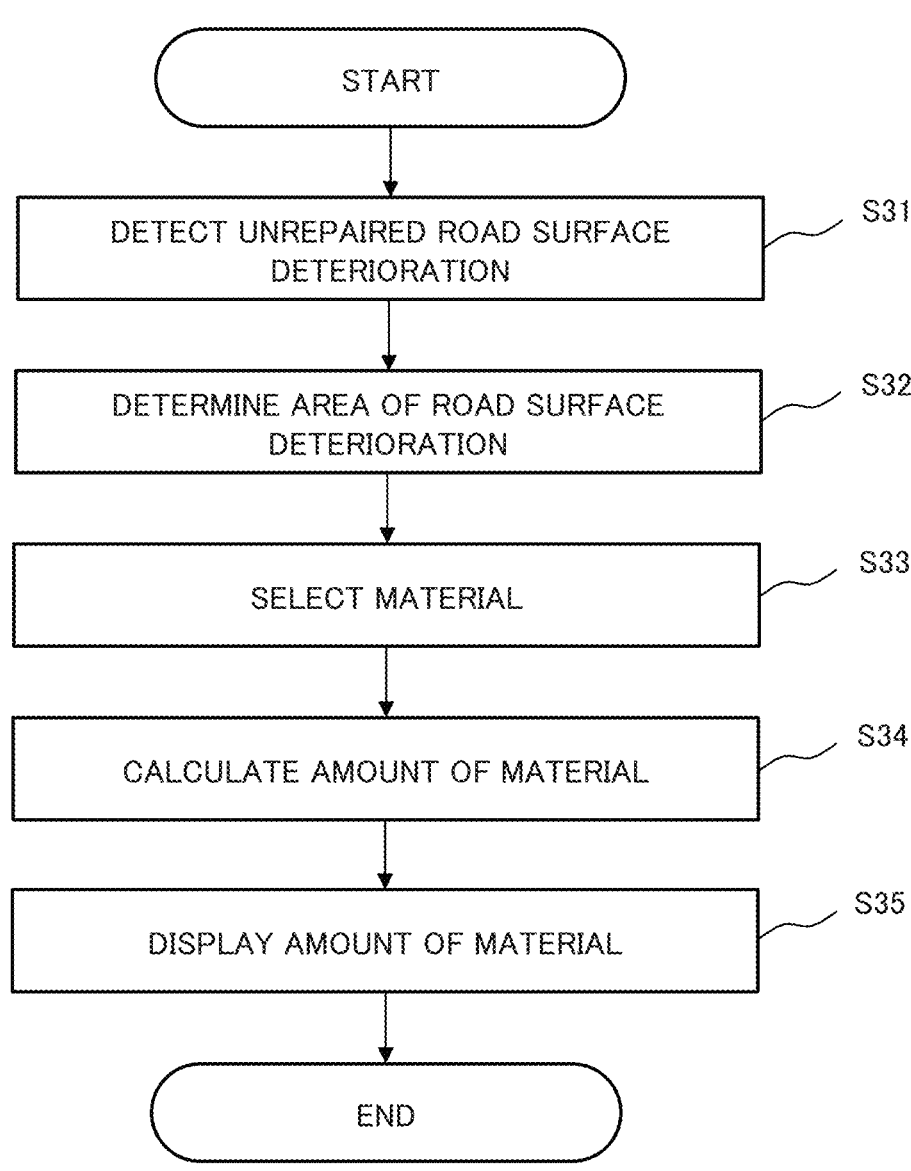
FIG. 9 is a flowchart showing an operation example according to the third example embodiment.

FIG. 9 is a flowchart showing an operation example of the repair assistance system 100 according to the third example embodiment.

The detection unit 101 detects unrepaired road surface deterioration from a road surface image obtained by imaging a road surface (step S31). The detection unit 101 passes a detection result to the determination unit 102.

The determination unit 102 determines an area of road surface deterioration to be temporarily repaired based on the detection result (step S32). The determination unit 102 passes the determined area of the road surface deterioration to the calculation unit 103.

The material selection unit 105 selects which type of material to use (step S33). The material selection unit 105 transmits the type of the selected material to the calculation unit 103. Step S33 may be performed before step S31 or step S32.

The calculation unit 103 calculates an amount of the material to be used for the temporary repair based on the determined area and the type of the selected material (step S34). The calculation unit 103 transmits a calculation result to the display control unit 104.

The display control unit 104 displays the calculated amount of the material of the selected type (step S35).

The type of the material may be selected, for example, by any method described below. The type of the material may also be selected by combining a plurality of methods.

For example, the material selection unit 105 may select the type of the material for the temporary repair according to parameters regarding the road surface. The parameters regarding the road surface include, for example, a material for pavement, a type of road surface deterioration, a degree of progress of the road surface deterioration, a road shape, a traffic volume, and driving condition information. The material selection unit 105 acquires the parameters from the detection unit 101, for example. Alternatively, the material selection unit 105 may acquire the parameters from a database that stores position information of a position where the road surface image has been captured and the parameters in association with each other. The material selection unit 105 may select the type of the material according to at least one of the parameters regarding the road surface.

The type of the material to be used is different depending on the material for pavement, the type of the road surface deterioration, and the degree of progress of the road surface deterioration.

The detection unit 101 may detect the material for pavement from the road surface image. For example, the detection unit 101 may detect whether the pavement is asphalt-based or concrete-based. The detection unit 101 may distinguish the type of the road surface deterioration. For example, the detection unit 101 may detect the type of the road surface deterioration including a linear crack, an alligator crack, a pothole, rutting, or other flatness abnormalities. The degree of progress of the road surface deterioration may be detected from the road surface image or may be calculated from the value of the sensor attached to the vehicle.

The road shape indicates, for example, whether the road is straight or curved and is flat or sloping. Safety is particularly required for curves and slopes, and thus a less slippery type of a material may be selected.

In a road with a large traffic volume, road surface deterioration tends to progress quickly. Therefore, a more durable type of a material may be selected. The traffic volume includes an amount of vehicles or people passing on a road per unit time.

The driving condition information indicates whether a dangerous event regarding driving has occurred. The dangerous event is, for example, a traffic accident or a dangerous driving operation. For a road on which the dangerous event has occurred, a less slippery or durable type of a material may be selected.

The driving condition information may include the number of traffic accidents or the number of dangerous driving operations. The number of traffic accidents may be recorded based on acceleration caused by an impact in a collision accident acquired from a vehicle. The dangerous driving operation may be detected by using, for example, a steering wheel angle or a brake stepping-in amount acquired from the vehicle. In a case where a driver suddenly turns the steering wheel greatly and in a case where a driver brakes suddenly, the number of times of dangerous operations is recorded.

The material selection unit 105 may select the type of the material based on, for example, a table shown in FIG. 10. In FIG. 10, the type of the material to be used for repair is selected according to the type of the road surface deterioration and the material for pavement. The calculation unit 103 may calculate the amount of the material of the selected type by referring to an amount of use per unit area included in the table of FIG. 10.

The material selection unit 105 may select the type of the material based on a type of a material used in the past. The material selection unit 105 may select the same material as the material used in the past for a road surface near a road surface to be temporarily repaired.

The nearby road surface is, for example, a road surface for which the same local government is in charge of temporary repair. This is because there is a possibility that the same material is used in the same local government. The material selection unit 105 refers to records regarding the temporary repair in the local government. The material selection unit 105 refers to the type of the material used for repair included in the records and selects the same or similar material.

Alternatively, the nearby road surface may be a road surface having a distance within a predetermined range. There is a possibility that road surfaces that are close in distance have similar parameters regarding the road surfaces, and thus there is a possibility that the same material is suitable. The material selection unit 105 acquires, for example, information regarding a position of the road surface to be temporarily repaired from the detection unit 101. The material selection unit 105 refers to records including materials used for temporary repair and positions of temporarily repaired road surfaces.

The material selection unit 105 may select a material designated by the user. For example, the display control unit 104 displays a screen that accepts selection of the type of the material. The calculation unit 103 calculates an amount of the material designated by the user.

In order for the user to appropriately select the type of the material, the display control unit 104 may display at least one of a price, life, and construction feature of a plurality of materials in a comparable manner. The price of the material may be one of a price for the amount of the material to be used, a price per unit area, and a price per unit amount. The life of the material indicates, for example, a period until a repair material peels off or a period until the repair material deteriorates. The construction feature includes, for example, whether water or heating is required at the time of use and a working time until construction is completed or a time from the start of construction until a road is passable.

FIG. 11 shows an example of a material comparison screen. According to such display, the user can consider a material to be used in consideration of its life and price. In a case where the life of a repair material lasts until the next entire repair, the user can consider using a low-priced material.

The material selection unit 105 may select the type of the material based on a budget. For example, the user sets a budget. For example, the material selection unit 105 calculates a maximum amount of the material available within the budget for each type of material. The material selection unit 105 further acquires the amount of the material to be used for temporary repair calculated by the calculation unit 103. Then, the material selection unit 105 selects the type of the material in which the amount of the material to be used for temporary repair calculated by the calculation unit 103 does not exceed the maximum amount of the material available within the budget.

A method of selecting the material based on the budget is not limited to the above. For one or more types of materials, the material selection unit 105 requests the calculation unit 103 to calculate a price of the material to be used. For example, in a case where the calculated price of the material exceeds the budget set by the user, the material selection unit 105 requests the calculation unit 103 to calculate a price of another cheaper type of material obtained in a case where the material to be used is switched to the cheaper type of material. Alternatively, in a case where a plurality of types of materials is combined, the material selection unit 105 requests the calculation unit 103 to calculate a price of the materials obtained in a case where the proportion of use of another cheaper type of material is increased. In this way, the material selection unit 105 selects the type of the material with which the unrepaired road surface deterioration of the area determined by the determination unit 102 can be repaired within the budget.

In a case where a difference between the price of the material calculated by the calculation unit 103 for one or more types of materials and the budget set by the user is equal to or larger than a predetermined amount, and the calculated price of the material is smaller, the material selection unit 105 may select a higher-priced type of material. In a case where the difference between the calculated price of the material and the budget set by the user is small, the material selection unit 105 may not select another type of material.

The display control unit 104 may display the type of the material selected based on the budget as on a screen of FIG. 12. Information shown in FIG. 12 may be displayed together with the screens of FIGS. 6 and 7. The display control unit 104 may further indicate, on the map or the road surface image, which type of material is used for which road surface or road surface deterioration.

In a case where the selected material is used, the calculation unit 103 may further calculate an area of road surface deterioration repairable within the budget. For example, the calculation unit 103 obtains the area of the road surface deterioration repairable within the budget by dividing the budget by the price of the material per unit area of the selected material. The area of the road surface deterioration repairable within the budget may be larger or smaller than the area of the road surface deterioration to be temporarily repaired determined by the determination unit 102.

The display control unit 104 may display the area of the road surface deterioration repairable within the budget as on a screen of FIG. 13. Information shown in FIG. 13 may be displayed together with the screens of FIGS. 6 and 7. The display control unit 104 may further indicate the road surface or road surface deterioration repairable within the budget on the map or on the road surface image.

In a case where the area of the road surface deterioration repairable within the budget is larger than the area of the road surface deterioration to be temporarily repaired determined by the determination unit 102, the user knows that the budget is left over. Therefore, the user may add road surface deterioration to be temporarily repaired. Alternatively, the user may select a higher-priced repair material.

According to the third example embodiment, the material selection unit 105 selects which type of material to use. Therefore, the user can use an appropriate type of material from among a plurality of types. Further, the calculation unit 103 calculates an amount of the selected material to be used. Therefore, the user can appropriately grasp a cost of the material to be used for temporary repair.

Modification Example

The repair assistance system 100 according to each of the above example embodiments can be modified as follows, for example.

(Display of Detection Result)

The display control unit 104 may indicate the unrepaired road surface deterioration detected by the detection unit 101 on the road surface image. For example, the display control unit 104 may color a road surface deterioration portion in the road surface image. The display control unit 104 may display the road surface deterioration in different colors according to the type of the road surface deterioration. For example, the display control unit 104 displays a longitudinal crack, a transverse crack, an alligator crack, and a pothole in different colors. The display control unit 104 may further display temporarily repaired road surface deterioration, a compartment line, road surface marking, a road surface, a shadow, and a manhole in different colors.

(Correction of Detection Result)

Error detection or detection omission may occur in image recognition of the unrepaired road surface deterioration by the detection unit 101. The display control unit 104 may display a screen that accepts correction of the detection result by the detection unit 101. For example, the user selects a region of the road surface image on the screen and inputs correction of a detection result of whether the selected region is unrepaired road surface deterioration. The detection unit 101 may output the detection result of detecting the unrepaired road surface deterioration based on the correction by the user. According to the above processing, the detection unit 101 can correct the error detection.

The determination unit 102 may redetermine the area of the road surface deterioration based on the correction of the detection result. The calculation unit 103 may recalculate the amount of the material to be used for temporary repair based on the redetermination of the area. The display control unit 104 displays the recalculated amount of the material.

(Determination of Target to Be Temporarily Repaired)

The determination unit 102 may determine whether to temporarily repair unrepaired road surface deterioration. The determination unit 102 determines an area of the determined road surface deterioration.

The determination unit 102 may determine whether to temporarily repair each part of the road surface deterioration included in the same road surface image. Alternatively, whether to perform temporary repair may be determined for each unit region.

The road surface deterioration to be temporarily repaired may be determined, for example, by any method described below. The road surface deterioration to be temporarily repaired may be determined by combining a plurality of methods.

For example, the determination unit 102 may determine the road surface deterioration to be temporarily repaired based on input by the user. The display control unit 104 may display a screen that accepts, from the user, selection of the road surface deterioration to be temporarily repaired from detected road surface deterioration portions. The user may select whether to set the road surface deterioration as a target to be repaired by clicking a road surface deterioration portion in the road surface image. Alternatively, the user may select the unit region to be repaired by clicking the unit region on the map.

The display control unit 104 may display a result of comparison between a price of the material to be used for temporary repair of the selected road surface deterioration and a budget set by the user. The user may delete and add the road surface deterioration to be temporarily repaired while confirming the road surface deterioration repairable within the budget.

The determination unit 102 may determine the road surface deterioration whose degree of progress satisfies a predetermined reference as a target to be temporarily repaired. The degree of progress of the road surface deterioration is determined based on, for example, a crack rate, a crack width, a crack length, a diameter of a pothole, or an area of the road surface deterioration.

For example, the determination unit 102 may determine the road surface deterioration whose degree of progress exceeds a lower threshold as the target to be temporarily repaired. This is because the road surface deterioration equal to or less than the lower threshold does not need to be temporarily repaired. The determination unit 102 may determine the road surface deterioration whose degree of progress is less than an upper threshold as the target to be temporarily repaired. This is because large road surface deterioration equal to or more than the upper threshold may be set to a target to be entirely repaired instead of the target to be temporarily repaired. Each threshold may be set by the user. This is because a budget scale is different depending on the local government that is in charge of temporary repair.

The determination unit 102 may determine, as the target to be temporarily repaired, the road surface deterioration in the unit region where the degree of progress of the road surface deterioration for each unit region satisfies the predetermined reference. The predetermined reference may be either an upper limit or lower limit of the degree of progress.

The calculation unit 103 may calculate an amount and price of the material based on an area of the road surface deterioration determined as the target to be temporarily repaired. The display control unit 104 displays the amount and price of the material to be used for the road surface to be temporarily repaired.

(Determination on Repair Priority)

The determination unit 102 may determine a priority of temporary repair for each unit region based on the degree of progress of the road surface deterioration in each unit region. For example, the determination unit 102 may determine the priority in descending order of the area of the road surface deterioration in the unit region.

The display control unit 104 may display the determined priority. The user may start temporary repair in descending order of the displayed priority.

The determination unit 102 may determine the road surface deterioration in the unit region as the target to be temporarily repaired in descending order of the priority. For example, the determination unit 102 determines the target to be temporarily repaired so as not to exceed the area of the road surface deterioration repairable within the budget. The calculation unit 103 calculates a price of the material to be used for the temporary repair of the unit region determined as the target to be temporarily repaired. When the priority is determined, the determination unit 102 can determine road surface deterioration to be repaired within the budget.

(Calculation of Amount of Material to Be Used for Entire Repair)

The repair assistance system 100 may be used to calculate the amount of the material to be used for the entire repair.

For example, the determination unit 102 determines an area of a road surface to be entirely repaired. The determination unit 102 may determine a target to be entirely repaired based on selection by the user or may determine the target to be entirely repaired based on the degree of progress of the road surface deterioration. The calculation unit 103 calculates the amount of the material to be used for the entire repair based on the determined area. The display control unit 104 displays the amount of the material to be used for the entire repair.

(Position of Road Surface Deterioration on Map)

The display control unit 104 may display a position of the unrepaired road surface deterioration on the map. For example, the display control unit 104 acquires the position of the unrepaired road surface deterioration from the detection unit 101. Similarly, the display control unit 104 may display a position of the temporarily repaired road surface deterioration on the map. The display control unit 104 may display the unrepaired road surface deterioration and the temporarily repaired road surface deterioration by different icons.

The display control unit 104 may display, on the map, a position of the road surface deterioration to be temporarily repaired among unrepaired road surface deterioration portions. The display control unit 104 may display the road surface deterioration to be temporarily repaired and road surface deterioration not to be temporarily repaired by different icons.

(Management of Repaired Road Surface Deterioration)

The repair assistance system 100 may include a management unit that manages repaired road surface deterioration. For example, the management unit generates a record regarding temporary repair. The record may include a position of a temporarily repaired road surface and a time of the temporary repair.

The management unit may record that road surface deterioration detected in the past has been repaired based on input by the user. By referring to the record, the determination unit 102 may exclude the repaired road surface deterioration from the target to be repaired.

Alternatively, the management unit may generate a temporary repair history based on the detection result. The detection unit 101 detects that unrepaired road surface deterioration has been repaired by comparing road surface images captured at two points of time. Similarly, the detection unit 101 may detect peeling off of the repair material or deterioration of the repair material. The management unit records a road surface from which the repair material has peeled off and a position of a deteriorated road surface.

[Hardware Configuration]

In the example embodiments described above, each component of the repair assistance system 100 indicates a functional unit block. Some or all of the components of the repair assistance system 100 may be implemented by any combination of a computer 500 and a program.

Figure 14:
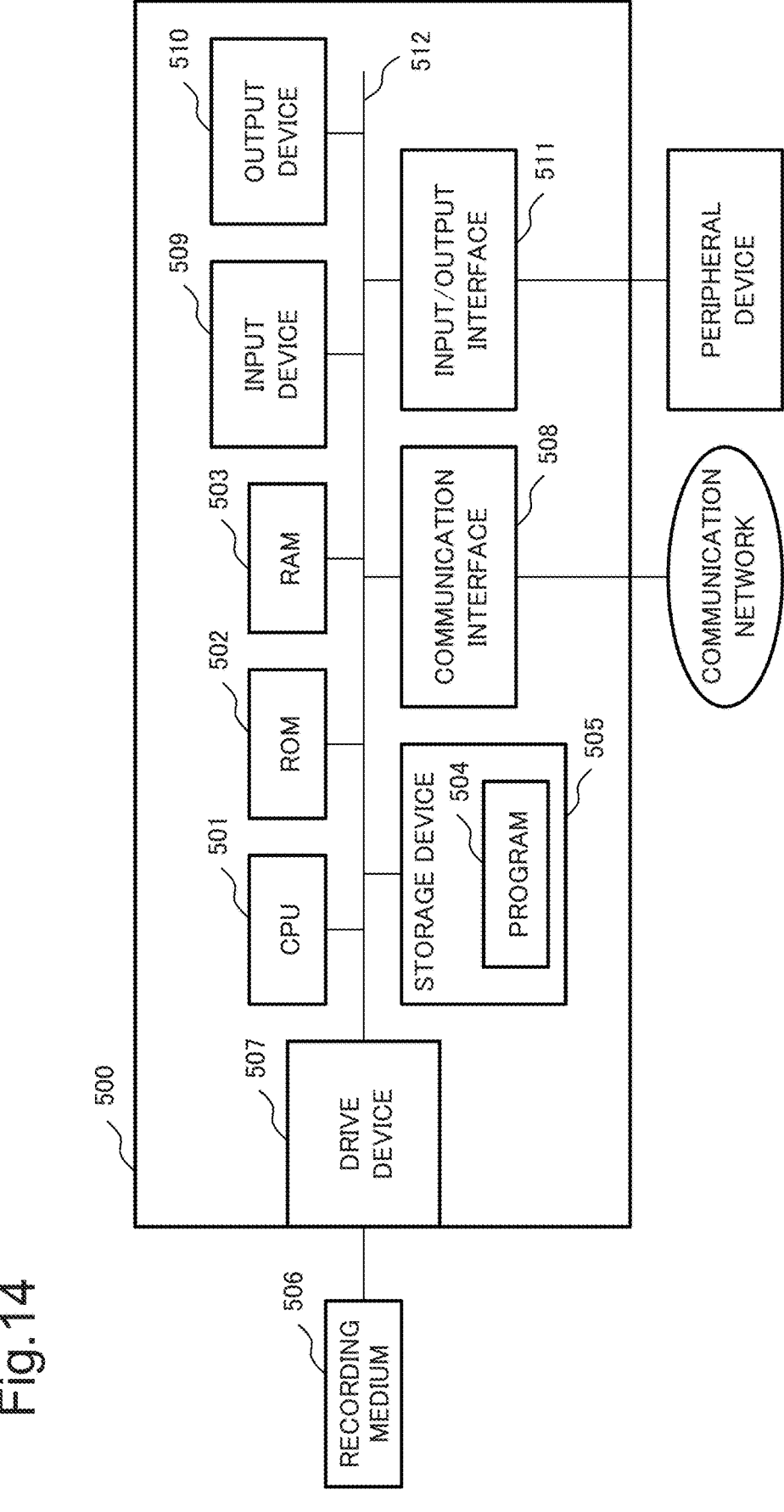
FIG. 14 is a block diagram showing an example of a hardware configuration.

FIG. 14 is a block diagram showing a hardware configuration example of the computer 500. Referring to FIG. 14, the computer 500 includes, for example, a central processing unit (CPU) 501, a read only memory (ROM) 502, a random access memory (RAM) 503, a program 504, a storage device 505, a drive device 507, a communication interface 508, an input device 509, an input/output interface 511, and a bus 512.

The program 504 includes instructions for implementing the functions of the repair assistance system 100. The program 504 is stored in advance in the ROM 502, the RAM 503, or the storage device 505. The CPU 501 implements each function of each device by executing the instructions included in the program 504. For example, the CPU 501 of the repair assistance system 100 executes the instructions included in the program 504 to implement the functions of the repair assistance system 100. The RAM 503 may store data to be processed by each function of the repair assistance system 100. For example, the road surface image may be stored in the RAM 503 of the computer 500.

The drive device 507 reads and writes data from and to a recording medium 506. The communication interface 508 provides an interface with a communication network. The input device 509 is, for example, a mouse, keyboard, or the like and accepts input of information from the user. An output device 510 is, for example, a display and outputs (displays) information to the user. The input/output interface 511 provides an interface with a peripheral device. The bus 512 connects the components of the hardware. The program 504 may be supplied to the CPU 501 via the communication network or may be stored in advance in the recording medium 506, read by the drive device 507, and supplied to the CPU 501.

The hardware configuration in FIG. 14 is an example, and other components may be added, or some of the components may not be included.

The method of implementing each device includes various modification examples. For example, each device may be implemented by any combination of a computer and a program different for each component. A plurality of components included in each device may be implemented by any combination of a single computer and program.

Some or all of the components of each device may be implemented by general-purpose or dedicated circuitry including a processor and the like or a combination thereof. Those circuits may be configured by a single chip or may be configured by a plurality of chips connected via a bus. Some or all of the components of each device may be implemented by a combination of the above circuit or the like and a program.

In a case where some or all of the components of each device are implemented by a plurality of computers, circuits, or the like, the plurality of computers, circuits, or the like may be arranged in a centralized manner or in a distributed manner.

At least a part of the repair assistance system 100 may be provided in a software as a service (SaaS) format. That is, at least some of the functions for implementing the repair assistance system 100 may be executed by software executed via a network.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims. The configurations in the example embodiments and the modification examples can be combined with each other without departing from the scope of the present disclosure.

Some or all of the above example embodiments can be described as in the following supplementary notes, but are not limited to the following.

[Supplementary Note 1]

A repair assistance system including:

detection means configured to detect unrepaired road surface deterioration from a road surface image obtained by imaging a road surface;

determination means configured to determine an area of road surface deterioration to be temporarily repaired based on a detection result; and calculation means configured to calculate an amount of a material to be used for temporary repair of the road surface based on the determined area.

[Supplementary Note 2]

The repair assistance system according to Supplementary Note 1, in which:

the determination means determines the area of the road surface deterioration to be temporarily repaired included in one or more regions, among regions into which the road surface is divided within a predetermined range; and the calculation means calculates the amount of the material to be used in the one or more regions.

[Supplementary Note 3]

The repair assistance system according to Supplementary Note 1 or 2, further including material selection means configured to select a type of the material to be used for the temporary repair.

[Supplementary Note 4]

The repair assistance system according to Supplementary Note 3, in which the material selection means selects the type of the material according to at least one of a material for pavement, a type of road surface deterioration, a degree of progress of the road surface deterioration, a road shape, a traffic volume, or driving condition information.

[Supplementary Note 5]

The repair assistance system according to Supplementary Note 3 or 4, in which the material selection means selects the type of the material based on a type of a material used in a past.

[Supplementary Note 6]

The repair assistance system according to any one of Supplementary Notes 3 to 5, further including display control means configured to display at least one of a price, life, or construction feature of a plurality of materials in a comparable manner.

[Supplementary Note 7]

The repair assistance system according to any one of Supplementary Notes 3 to 6, in which the material selection means accepts selection of the type of the material from a user.

[Supplementary Note 8]

The repair assistance system according to any one of Supplementary Notes 3 to 7, in which in a case where the selected material is used, the calculation means calculates the area of the road surface deterioration repairable within a budget based on a price of the material per area.

[Supplementary Note 9]

The repair assistance system according to any one of Supplementary Notes 3 to 8, in which:

the calculation means calculates a price of the material for the calculated amount of the material; and the material selection means selects the type of the material based on a budget.

[Supplementary Note 10]

The repair assistance system according to any one of Supplementary Notes 1 to 8, in which the calculation means calculates a price of the material for the calculated amount of the material.

[Supplementary Note 11]

The repair assistance system according to any one of Supplementary Notes 1 to 10, in which the determination means determines whether to temporarily repair the unrepaired road surface deterioration.

[Supplementary Note 12]

The repair assistance system according to any one of Supplementary Notes 1 to 11, in which the determination means determines a priority of the temporary repair for each region based on a degree of progress of the road surface deterioration in each region.

[Supplementary Note 13]

The repair assistance system according to any one of Supplementary Notes 1 to 12, in which the detection means further detects temporarily repaired road surface deterioration from the road surface image.

[Supplementary Note 14]

A repair assistance method including:

detecting unrepaired road surface deterioration from a road surface image obtained by imaging a road surface;

determining an area of road surface deterioration to be temporarily repaired based on a detection result; and calculating an amount of a material to be used for temporary repair of the road surface based on the determined area.

[Supplementary Note 15]

A recording medium that non-transiently records a program for causing a computer to execute processing of:

detecting unrepaired road surface deterioration from a road surface image obtained by imaging a road surface;

determining an area of the unrepaired road surface deterioration based on a detection result; and calculating an amount of a material to be used for temporary repair of the road surface based on the determined area.

REFERENCE SIGNS LIST

100 Repair assistance system
101 Detection unit
102 Determination unit
103 Calculation unit
104 Display control unit
105 Material selection unit

What is claimed is:

1. A repair assistance system comprising:

at least one memory configured to store instructions; and at least one processor configured to execute the instructions to:

detect unrepaired road surface deterioration from a road surface image obtained by imaging a road surface, the detection performed on a pixel-by-pixel basis;

determine an area of road surface deterioration to be subjected to temporary repair based on the detected unrepaired road surface deterioration, by converting pixel count of detected deterioration into actual road surface area based on predefined pixel-to-area conversion ratios;

transmit, to a display device, decision making support information that displays a price, a life, and a construction feature of a plurality of types of materials in a comparable manner that enables side-by-side evaluation for material selection, wherein the life of the material indicates a period until the repair material peels off or deteriorates;

accept, from a user, selection of a type of material to be used for the temporary repair;

calculate an amount of the material for the selected type of material to be used for the temporary repair of the road surface based on the determined area;

calculate the price of the material for the calculated amount of the material for the selected type of material; and transmit to the display device, the price of the material calculated.

2. The repair assistance system according to claim 1, wherein the at least one processor is further configured to execute the instructions to:

determine the area of the road surface deterioration to be subjected to the temporary repair included in one or more regions, among regions into which the road surface is divided within a predetermined range; and calculate the amount of the material to be used in the one or more regions.

3. The repair assistance system according to claim 1, wherein the at least one processor is further configured to execute the instructions to:

select the type of the material according to at least one of a material for pavement, a type of road surface deterioration, a degree of progress of the road surface deterioration, a road shape, a traffic volume, or driving condition information.

4. The repair assistance system according to claim 1, wherein the at least one processor is further configured to execute the instructions to:

select the type of the material based on a type of a material used in a past.

5. The repair assistance system according to claim 1, wherein the at least one processor is further configured to execute the instructions to:

in a case where the selected material is used, calculate the area of the road surface deterioration repairable within a budget based on a price of the material per area.

6. The repair assistance system according to claim 1, wherein the at least one processor is further configured to execute the instructions to:

select the type of the material based on a budget.

7. The repair assistance system according to claim 1, wherein the at least one processor is further configured to execute the instructions to:

determine whether to perform the temporary repair of the unrepaired road surface deterioration.

8. The repair assistance system according to claim 1, wherein the at least one processor is further configured to execute the instructions to:

determine a priority of the temporary repair for each region based on a degree of progress of the road surface deterioration in each region.

9. The repair assistance system according to claim 1, wherein the at least one processor is further configured to execute the instructions to:

detect temporarily repaired road surface deterioration from the road surface image.

10. A repair assistance method comprising:

detecting unrepaired road surface deterioration from a road surface image obtained by imaging a road surface, wherein the detection is performed on a pixel-by-pixel basis;

determining an area of road surface deterioration to be temporarily repaired based on the detected unrepaired road surface deterioration, by converting a pixel count of detected deterioration into an actual road surface area based on predefined pixel-to-area conversion ratios;

transmitting, to a display device, decision making support information that displays a price, a life, and a construction feature of a plurality of types of materials in a comparable manner that enables side-by-side evaluation for material selection, wherein the life of the material indicates a period until the repair material peels off or deteriorates;

accepting, from a user, selection of a type of material to be used for the temporary repair;

calculating an amount of the material for the selected type of material to be used for the temporary repair of the road surface based on the determined area;

calculating the price of the material for the calculated amount of the material for the selected type of material; and transmitting, to the display device, the price of the material calculated.

11. A recording medium that non-transiently records a program for causing a computer to execute processing comprising:

detecting unrepaired road surface deterioration from a road surface image obtained by imaging a road surface, wherein the detection is performed on a pixel-by-pixel basis;

determining an area of the unrepaired road surface deterioration to be temporarily repaired based on the detected unrepaired road surface deterioration, by converting a pixel count of detected deterioration into an actual road surface area based on predefined pixel-to-area conversion ratios;

transmitting, to a display device decision making support information that displays a price, a life, and a construction feature of a plurality of types of materials in a comparable manner that enables side-by-side evaluation for material selection, wherein the life of the material indicates a period until the repair material peels off or deteriorates;

accepting, from a user, selection of a type of material to be used for the temporary repair;

calculating an amount of the material for the selected type of material to be used for the temporary repair of the road surface based on the determined area;

calculating the price of the material for the calculated amount of the material for the selected type of material; and transmitting, to the display device, the price of the material calculated.

12. The repair assistance method according to claim 10, further comprising:

determining the area of the road surface deterioration to be subjected to the temporary repair included in one or more regions, among regions into which the road surface is divided within a predetermined range; and calculating the amount of the material to be used in the one or more regions.

13. The recording medium according to claim 11, wherein the program further causing the computer to execute processing of:

determining the area of the road surface deterioration to be subjected to the temporary repair included in one or more regions, among regions into which the road surface is divided within a predetermined range; and calculating the amount of the material to be used in the one or more regions.

* * * * *